United States Patent
Baumann et al.

(10) Patent No.: US 11,707,993 B2
(45) Date of Patent: Jul. 25, 2023

(54) SYSTEM AND METHOD FOR CHARGING BATTERY UNITS OF WORK MACHINES

(71) Applicant: Caterpillar Inc., Peoria, IL (US)

(72) Inventors: Jonathan Matthew Baumann, Hanna City, IL (US); Dustin Craig Selvey, Eureka, IL (US); Jason Lee Miller, Princeville, IL (US); Alexander C. Crosman, III, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/443,466

(22) Filed: Jul. 27, 2021

(65) Prior Publication Data

US 2023/0035165 A1 Feb. 2, 2023

(51) Int. Cl.
*B60L 50/16* (2019.01)
*B60L 53/60* (2019.01)
*H02J 7/00* (2006.01)
*B60L 53/16* (2019.01)

(52) U.S. Cl.
CPC ............ *B60L 50/16* (2019.02); *B60L 53/16* (2019.02); *B60L 53/60* (2019.02); *H02J 7/0042* (2013.01)

(58) Field of Classification Search
CPC .............................. B60L 50/16; H02J 7/0042
USPC ........................................................ 320/109
See application file for complete search history.

(56) References Cited

U.S. PATENT DOCUMENTS

| 7,135,836 | B2 | 11/2006 | Kutkut et al. | |
|---|---|---|---|---|
| 8,319,478 | B2 | 11/2012 | Humphrey et al. | |
| 8,378,623 | B2 | 2/2013 | Kusch et al. | |
| 9,238,415 | B2 | 1/2016 | King et al. | |
| 10,081,258 | B2 | 9/2018 | Kusch et al. | |
| 2002/0081486 | A1* | 6/2002 | Williams | H01M 50/581 180/68.5 |
| 2011/0304298 | A1 | 12/2011 | Gow et al. | |
| 2016/0167536 | A1 | 6/2016 | Lasagni | |
| 2018/0229613 | A1* | 8/2018 | Rajaie | B60L 53/16 |
| 2020/0044464 | A1* | 2/2020 | Sasu | H02J 7/0044 |
| 2020/0175551 | A1* | 6/2020 | Penilla | B60L 53/80 |
| 2021/0050725 | A1* | 2/2021 | Jensen | H02J 7/0047 |

\* cited by examiner

*Primary Examiner* — Suchin Parihar
(74) *Attorney, Agent, or Firm* — Bookoff McAndrews, PLLC (57) ABSTRACT

A system for charging a battery unit to power a work machine. The system includes a charger to charge the battery unit, charging receptacles, power supply connectors, and a charging controller. The power supply connectors are configured to be received into the charging receptacles to attain connections between the charger and the battery unit. The charging controller is communicably coupled to the charger and is configured to receive an input corresponding to a net charge capacity of the battery unit; determine a power to be supplied to the battery unit by the charger to charge the battery unit in response to the input; and supply the power to the battery unit from the charger through the connections. The power to be supplied to the battery unit corresponds to a maximum possible power that meets the net charge capacity of the battery unit in the shortest possible time.

20 Claims, 3 Drawing Sheets

SYSTEM AND METHOD FOR CHARGING BATTERY UNITS OF WORK MACHINES

TECHNICAL FIELD

The present disclosure relates to work machines powered by a battery unit. More particularly, the present disclosure relates to a system and a method to manage and charge the battery unit.

BACKGROUND

Machines, such as battery-operated machines, are being increasingly preferred or applied at various worksites, such as mining sites, etc., as they provide many advantages over machines that are run by engines in which fossil fuels are combusted for the production of power. One advantage is that battery-operated machines generally emit substantially negligible or nil combustion byproducts. Such an advantage is useful in underground mining environments where complex and/or costly ventilation systems may be required to provide fresh air and an exhaust route to gases emitted from combustion engines if combustion engines were applied.

However, battery-operated machines do require to be periodically charged so that said machines may be regularly replenished with energy to perform work. A battery charging process is typically time consuming, and results in machine down-time. Thus, for any duration a battery-operated machine is being charged, the machine stands grounded and is inoperative, leading to a reduction in the overall productivity of the machine since it is not typically operating (e.g., excavating, mining, maneuvering) while it is being charged.

U.S. Pat. No. 9,238,415 (the '415 reference) relates to electric drive systems including hybrid and electric vehicles and to stationary drives that are subject to transient or pulsed loads. The '415 reference includes transferring energy between an energy storage device of the vehicle or drive and a power source external to the vehicle or drive to rapidly charge the energy storage device.

SUMMARY OF THE INVENTION

In one aspect, the disclosure relates to a system for charging a battery unit to power a work machine. The system includes at least one charger to charge the battery unit, one or more charging receptacles, one or more power supply connectors, and a charging controller. The power supply connectors are configured to be correspondingly received into the charging receptacles to correspondingly attain one or more connections between the charger and the battery unit. The charging controller is communicably coupled to the charger. The charging controller is configured to receive an input corresponding to a net charge capacity of the battery unit; determine a power to be supplied to the battery unit by the charger to charge the battery unit in response to the input; and supply the power to the battery unit from the charger through the connections. The power to be supplied to the battery unit corresponds to a maximum possible power that is supplied to meet the net charge capacity of the battery unit in shortest possible time.

In another aspect, the disclosure is directed to a method for charging a battery unit configured to power a work machine. The method includes receiving, by a charging controller, an input corresponding to a net charge capacity of the battery unit; determining, by the charging controller, a power to be supplied to the battery unit by at least one charger to charge the battery unit in response to the input; and supplying, by the charging controller, the power to the battery unit from the charger through one or more connections attained between the charger and the battery unit. The power to be supplied to the battery unit corresponds to a maximum possible power that is supplied to meet the net charge capacity of the battery unit in shortest possible time.

In yet another aspect, the disclosure relates to a machine system. The machine system includes a work machine, at least one charger, one or more charging receptacles, one or more power supply connectors, and a charging controller. The work machine includes a battery unit and the charger is configured to charge the battery unit. The power supply connectors are configured to be correspondingly received into the charging receptacles to correspondingly attain connections between the charger and the battery unit. The charging controller is communicably coupled to the charger. The charging controller is configured to: receive an input corresponding to a net charge capacity of the battery unit; determine a power to be supplied to the battery unit by the charger to charge the battery unit in response to the input; and supply the power to the battery unit from the charger through the connections. The power to be supplied to the battery unit corresponds to a maximum possible power that is supplied to meet the net charge capacity of the battery unit in shortest possible time.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
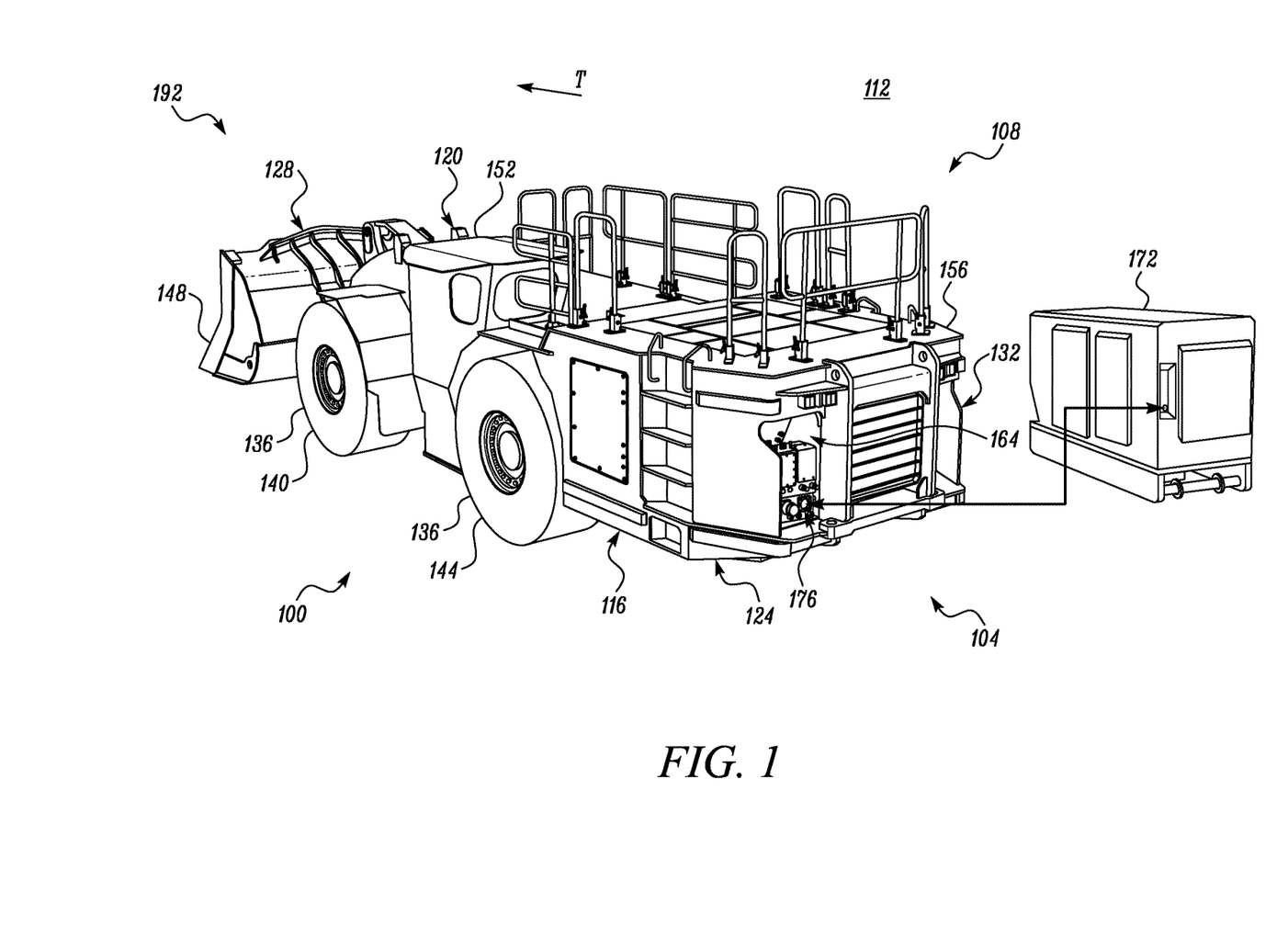
FIG. 1 is a rear perspective view of an exemplary machine that includes a charging port to charge a battery unit of the machine, in accordance with one or more aspects of the present disclosure.

Referring to FIG. 1, a machine 100 is shown. The machine 100 may be a work machine 104 that may be electrically powered, either partly or fully, and, in one embodiment, may embody an electrically operated machine (or simply an electric machine 108). The machine 100 may be applied at a worksite 112 that may correspond to a mining environment, and may exemplarily embody a load-haul-dump (LHD) machine that may be applicable in environments, such as underground mining environments. It is possible for the machine 100 to embody other types of machines applicable in other environments, such as over ground mining, construction, and transportation, as well.

The machine 100 may include a main frame assembly 116 that may exemplarily include a split frame configuration enabling the machine 100 to acquire a forward portion 120 and a rearward portion 124. The forward portion 120 and the rearward portion 124 may be articulable with respect to each other (e.g., at a hitch joint, not shown). The forward portion 120 may define a forward end 128 of the machine 100, while the rearward portion 124 may define a rearward end 132 of the machine 100. The machine 100 may include traction devices 136—e.g., the forward portion 120 may include forward wheels 140, while the rearward portion 124 may include rearward wheels 144.

Unless specified otherwise, terms such as 'forward', 'front', 'rear', 'rearward', as may be used in the present disclosure may be understood according to an exemplary direction, T, in which the machine 100 may move during operations. Said exemplary direction, T, is defined from the rearward end 132 towards the forward end 128 of the machine 100.

The forward portion 120 may include an implement 148 of the machine 100. The implement 148 may include a bucket that may be articulable so as to receive and haul load. The rearward portion 124 may include an operator cabin 152 and a power compartment 156 of the machine 100. The operator cabin 152 may be configured to house and station one or more operators, and may also include multiple input devices, such as joysticks, touchscreens, etc., (not shown) for the control of the many functions of the machine 100, e.g., machine motion and implement actuation. The power compartment 156 may enclose a power source of the machine 100. For example, the power source may include an electrical power source, such as a battery unit 160 (see FIG. 2). The power compartment 156 made be formed by assembling one or more outer panel assemblies, and may define an opening 164. The opening 164 may provide access into an interior of the power compartment 156 within which the power source, such as the battery unit 160, may be housed.

Figure 2:
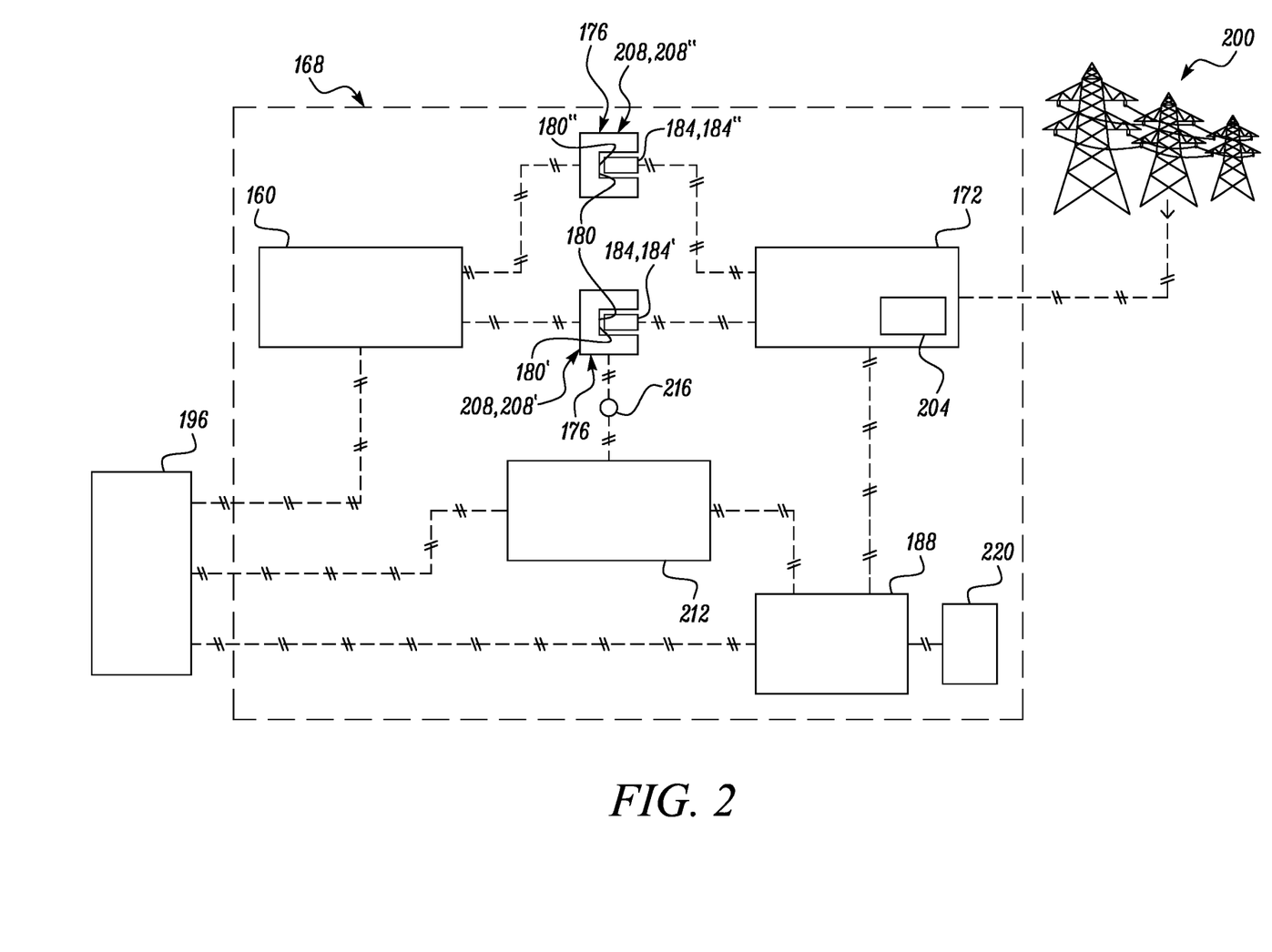
FIG. 2 is a schematic view of a system for charging the battery unit of the machine, in accordance with an aspect of the present disclosure.

Referring to FIGS. 1 and 2, the battery unit 160 may be configured to power the machine 100. For example, the battery unit 160 may power the machine's travel or movement over and across the worksite 112. Additionally, the battery unit 160 may also power one or more work related functions of the machine 100, e.g., the implement's actuation. As an example, the battery unit 160 may include a single battery, although the battery unit 160 may represent and/or include multiple batteries. In one example, electrical power from the battery unit 160 may be provided to various devices, such as inverters and/or converters (not shown) before having the electrical power supplied to one or more sub-systems and/or components of the machine 100. The sub-systems and or components of the machine 100 may include the traction devices 136 (i.e., the forward wheels 140 and/or the rearward wheels 144) or to implement's actuators (not shown). Powering the traction devices 136 may facilitate machine's travel (e.g., along direction, T), while powering the implement's actuators may facilitate the implement's actuation.

One or more aspects of the present disclosure relates to a system 168 for charging the battery unit 160. The system 168 may include at least one charger 172, a charging port 176 (see FIG. 1) with one or more charging receptacles 180, one or more power supply connectors 184. Further, the system 168 may also include a charging controller 188.

According to an aspect of the present disclosure, the system 168 along with the machine 100 may also represent a machine system 192 (see FIG. 1). In some embodiments, the machine system 192 includes a controller (referred to as a battery controller 196) (see FIG. 2). The battery controller 196 may be communicably or operatively coupled to the battery unit 160 and may be configured to accomplish one or more exemplary tasks associated with a working of the battery unit 160. In some embodiments, the battery controller 196 is communicably coupled to the battery unit 160 and is configured to determine data corresponding to a net charge capacity of the battery unit 160. In some embodiments, the battery controller 196 is housed within the machine 100 (e.g., within the power compartment 156 of the machine 100), although it is possible for the battery controller 196 to be positioned outside or remotely to the machine 100.

The charger 172 may be configured to charge the battery unit 160. In some embodiments, the charger 172 may be representative of multiple chargers, and may receive electrical power from a grid source 200 that may provide an incoming power in different phases, voltages, frequencies, currents, and/or the like. For example, the incoming power may be in the form of AC (alternating current) or DC (direct current) power. The charger 172 may be configured to convert the received electrical power into a form of electrical power that may be used to charge the battery unit 160.

In some embodiments, the charger 172 may include a detector 204 that may detect one or more parameters associated with a functioning of the charger 172. For example, the parameters may include a temperature of the charger 172 during a battery charging event. In such a case, the detector 204 may be calibrated to generate a signal, indicative of an operational temperature of the charger 172 based on the detected temperature of a component (e.g., a surface defined on a radiator core) (not shown) associated with the charger 172. The signal may be retrieved by the charging controller 188.

The charging receptacles 180 may be arranged on the charging port 176 (see FIG. 1) of the machine 100 and may be accessible from an outside of the machine 100 through the opening 164 in the power compartment 156. Exemplarily two charging receptacles—i.e., a first charging receptacle 180' and a second charging receptacle 180" (see FIG. 2) are shown. A higher or a lower number of charging receptacles 180 may be provided within the charging port 176. The charging receptacles 180 may include a number of power and signal cavities that may be configured to receive power and signal conductors of the power supply connectors 184.

The power supply connectors 184 may be operatively coupled to the charger 172—e.g., by way of a power cord or a power cable. The power supply connectors 184 may be in the form of power supply plugs, charging plugs, or may include CCS (combined charging system) type connectors, for being correspondingly received into the charging receptacles 180 so as to establish a connection (see connections 208) with the charging receptacles 180 and facilitate the charging of the battery unit 160. Exemplarily two power supply connectors—i.e., a first power supply connector 184' and a second power supply connector 184" are shown, and which may be correspondingly received into the first charging receptacle 180' and the second charging receptacle 180". A higher or a lower number of power supply connectors 184 may be contemplated. As an example, a number of the power supply connectors 184 may be equal to the number of the charging receptacles 180 such that the power supply connectors 184 may be correspondingly received into the charging receptacles 180 defined or provided within the charging port 176.

The receipt of the power supply connectors 184 into the charging receptacles 180 also helps attain the corresponding connections (i.e., the connections 208) between the charger 172 and the battery unit 160 and further helps facilitate a power supply from the charger 172 to the battery unit 160 so as to charge the battery unit 160. Given the two exemplary charging receptacles 180 and the two power supply connectors 184, two connections 208 may be defined or formed—i.e., a first connection 208' and a second connection 208". As electrical current or power may be supplied from the charger 172 to the power supply connectors 184, it may be envisioned that the electrical current or power may proceed to the charging receptacles 180, and said electrical current or power may proceed from the charging receptacles 180, via various electrical busses (not shown), to the battery unit 160 to charge the battery unit 160.

Certain discussions in the present disclosure may be directed towards a single charging receptacle (e.g., the first charging receptacle 180'), a single power supply connector (e.g., the first power supply connector 184'), and a single connection (e.g., the first connection 208' as attained by or between the first charging receptacle 180' and the first power supply connector 184') alone. Said discussions may be suitably applied to the second charging receptacle 180", the second power supply connector 184", and the second connection 208", as well. Wherever needed, references to each of the second charging receptacle 180", the second power supply connector 184", and the second connection 208", shall also be used.

In some embodiments, the system 168 may further include a supervisory module 212 operatively coupled to the first charging receptacle 180'. The supervisory module 212 may be configured to receive data corresponding to one or more parameters associated with the first charging receptacle 180'. For example, the supervisory module 212 may be configured to receive a signal indicative of a temperature of the first charging receptacle 180'. In this regard, the system 168 may include a sensor 216 (e.g., an infrared temperature sensor) that may sense a temperature of an element, such as a heat rejection element (not shown) that may receive heat generated from the first charging receptacle 180' during a battery charging event.

In the case of an infrared temperature sensor, for example, the sensor 216 may be oriented at or towards a surface of the heat rejection element to sense the temperature of the heat rejection element, and may be calibrated to generate a signal indicative of the temperature at the first charging receptacle 180' based on the sensed temperature of the surface of the heat rejection element. Additionally, or optionally, the signal may be indicative of a temperature of the first power supply connector 184' and/or of the first connection 208', as well. The signal may be retrievable by the charging controller 188.

The charging controller 188 may be operatively coupled to the charger 172, the battery controller 196, and to the supervisory module 212. Optionally, the charging controller 188 may be operatively coupled directly to the sensor 216. The charging controller 188 may be configured to receive a command to charge the battery unit 160 pursuant to attaining the connections (e.g., the first connection 208') between the charger 172 and the battery unit 160. The command may be indicative of a start of a charging event of the battery unit 160. The command may be generated by an electronic control module (ECM) of the machine 100 (e.g., as soon as the first connection 208' between the first charging receptacle 180' and the first power supply connector 184' is attained and/or detected). The command may be optionally generated by way of one or more of the input devices, which may be available within the operator cabin 152, as and when they may be accessed and/or manipulated by an operator.

In response to the receipt of the command, the charging controller 188 may be configured to retrieve a set of instruction from a memory 220 and run the set of instruction. Based on the running of the set of instruction, the charging controller 188 may be configured to extract and/or receive an input or data corresponding to a net charge capacity of the battery unit 160 (e.g., from the battery controller 196). In some embodiments, the net charge capacity of the battery unit 160 may relate to a capacity of the battery unit 160 available at any given point in time (and may not necessarily relate to the total charge capacity of the battery unit 160). For example, if the battery unit 160 is drained down to 30% of its total capacity from use during a work cycle, pursuant to which the battery charging event may be carried out, then during the battery charging event, the battery controller 196 may deliver the input to the charging controller 188 indicating that the net charge capacity of the battery unit 160 corresponds to 70% of the total capacity of the battery unit 160.

In response to the input, the charging controller 188 may be configured to determine a power to be supplied to the battery unit 160 by the charger 172 to charge the battery unit 160 based on the net charge capacity of the battery unit 160. Once the power to be supplied to the battery unit 160 is determined, the charging controller 188 is further configured to supply the power to the battery unit 160 from the charger 172 through the first connection 208'. According to an aspect of the present disclosure, the power to be supplied to the battery unit 160 corresponds to a maximum possible power that is supplied to meet the net charge capacity of the battery unit 160 within a predefined period or in the shortest possible time. The forthcoming description below includes exemplary discussions related to one or more factors that help the charging controller 188 determine the maximum possible power that is to be supplied to the battery unit 160 to charge the battery unit 160.

In some embodiments, a first factor for determining the maximum possible power may relate to total capacities of the first connection 208' and the second connection 208" for supplying power therethrough. Therefore, for determining the power to be supplied to the battery unit 160 to charge the battery unit 160, the charging controller 188 may determine the total capacities of the connections 208 (e.g., the first connection 208' and the second connection 208") for supplying the power (i.e., the maximum possible power) therethrough. In this regard, the charging controller 188 may be configured to detect corresponding capacities of the connections (e.g., the first connection 208' and the second connection 208") for supplying corresponding portions of the power therethrough. In some cases, it is possible for the corresponding capacities to be predefined and be stored in the memory 220 as a predefined data, and thus a detection by the charging controller 188 of the corresponding capacities may include a retrieval of such data. Once the corresponding capacities are detected or retrieved by the charging controller 188, the charging controller 188 may summate the capacities together to arrive at a total capacity of the connections 208 for supplying the power therethrough.

In some embodiments, a second factor for determining the maximum possible power may relate to an incoming power received by the charger 172 from the grid source 200. Therefore, for determining the power to be supplied to the battery unit 160 to charge the battery unit 160, the charging controller 188 may detect the incoming power (i.e., electrical power) from the grid source 200, as it may be delivered to the charger 172. The charging controller 188 may then compute and determine the power to be supplied to the battery unit 160 as a proportion to the incoming power from the grid source 200.

In some embodiments, a third factor for determining the maximum possible power may relate to an operational temperature associated with the charger 172. Therefore, for determining the power to be supplied to the battery unit 160 to charge the battery unit 160, the charging controller 188 may detect and compare an operational temperature associated with the charger 172 with an operational temperature threshold (e.g., retrievable from the memory 220). If the charging controller 188 detects that the operational temperature associated with the charger 172 exceeds the operational temperature threshold, the charging controller 188 may derate the charger 172 and reduce an amount from the power to be supplied to the battery unit 160 in proportion to a value by which the operational temperature exceeds the operational temperature threshold.

In some embodiments, a fourth factor for determining the maximum possible power may relate to a working temperature of one or more of the charging receptacles 180. Therefore, for determining the power to be supplied to the battery unit 160 to charge the battery unit 160, the charging controller 188 may estimate a portion of the power to be supplied to the battery unit 160 through at least one charging receptacle (e.g., first charging receptacle 180'). In some examples, the portion of the power may be retrieved from the memory 220. Further, the charging controller 188 may detect if a working temperature of said charging receptacle (e.g., the first charging receptacle 180') exceeds a working temperature threshold (e.g., retrievable from the memory 220). If the working temperature exceeds the working temperature threshold, the charging controller 188 may derate the first charging receptacle 180' or the first connection 208' and may reduce a quantity from the portion of the power suppliable therethrough in proportion to a measure by which the working temperature exceeds the working temperature threshold.

In some embodiments, during a charging event, the charging controller 188 may be configured to receive data corresponding to the net charge capacity of the battery unit 160 in successive intervals. This is because with every successive interval, the net charge capacity of the battery unit 160 may decrease and need to be updated as the charge in the battery unit 160 increases. The charging controller 188, in response to the decrease in the net charge capacity of the battery unit 160, may reduce the power to be supplied to the battery unit 160 for every successive interval in proportion to a decrease in the net charge capacity of the battery unit 160 for every successive interval.

In some embodiments, during or at the start of a battery charging event, the charging controller 188 may be configured to determine the shortest possible time within which the battery unit 160 may need to be charged. The shortest possible time may be made available to the charging controller 188 by the battery controller 196 itself, or, in some cases, the charging controller 188 may deduce the shortest possible time based on one or more of the model or type of the machine 100 or the battery unit 160. Optionally, the shortest possible time corresponding to the model or type of the machine 100 or the battery unit 160 may be stored within the memory 220 from where it may be retrieved by the charging controller 188. Once said data (i.e., the shortest possible time) is obtained or made available to the charging controller 188, the charging controller 188 may instruct the charger 172 to optimize a rate of charging or supply of power to the battery unit 160 across the shortest possible time so as to charge the battery unit 160 within the shortest possible time. It may be noted that the term 'shortest possible time' may also mean or encompass a predefined period, as already note above, and may encompass requirements of the battery unit 160 if a relatively 'slow charge' were preferred by the battery controller 196.

Considering one or more of the factors discussed above, e.g., where the power supply to the battery unit 160 may need to be reduced, it is possible that the shortest possible time may need to be changed. In such a case, the charging controller 188 may compute and provide a reworked shortest possible time and may communicate the same to the battery unit 160. The reworked shortest possible time may account for the reduced power supply owing to one or more of the above factors and may effectively incorporate an increase in time or duration in proportion to any decrease or reduction in the power supply.

While the charging controller 188 may proportionally reduce the power to be supplied to the battery unit 160 for every successive interval, the charging controller 188 may ensure that the reduced power suppliable in every successive interval may still be high enough to help attain a fully charged state of the battery unit 160 in the shortest possible time or the reworked shortest possible time. Additionally, or optionally, it may be possible for the time or duration to be changed by an operator.

The charging controller 188 may make use of the number of the connections 208 and/or the number of chargers (e.g., charger 172) so as to supply the highest possible power in the shortest possible time. In an example, more the number of connections and/or more the number of chargers, higher may be the power that may be suppliable to the battery unit 160 by the charger 172 to charge the battery unit 160. Additionally, lesser the instances where the charging receptacles 180 and/or such chargers (e.g., charger 172) are derated (e.g., because of increased working or operational temperatures), higher may be the power that may be suppliable to the battery unit 160 by the charger 172 to charge the battery unit 160.

Both the charging controller 188 and the battery controller 196 may be connected to the machine's electronic control module (ECM) (not shown), such as a safety module or a dynamics module, or may be configured as a stand-alone entities. Optionally, the charging controller 188 may be integral and be one and the same as one of the ECMs of the machine 100 or another machine or device and the battery controller 196 may be integral and be one and the same as another ECM of the machine 100. Further, both the charging controller 188 and the battery controller 196 may be a microprocessor-based device, and/or may be envisioned as application-specific integrated circuits, or other logic devices, which provide controller functionality, and such devices being known to those with ordinary skill in the art.

In one example, it is possible for the charging controller 188 and the battery controller 196 to include or be representative of one or more controllers having separate or integrally configured processing units to process a variety of data (or input). In some embodiments, the charging controller 188 and the battery controller 196 may be part of one and the same controlling entity. In some embodiments, a transmission of data transmission between the charging controller 188 and the battery controller 196 may be facilitated through a standardized CAN bus. Further, both the charging controller 188 and the battery controller 196 may be optimally suited for accommodation within certain machine panels or portions from where they may remain accessible for ease of use, service, calibration, and repairs. It is possible, however, for the charging controller 188 to be hard wired to the battery controller 196, to the sensor 216 and/or to the supervisory module 212. The charging controller 188 may also be hard wired to various other components and devices of the machine 100, e.g., the memory 220.

Processing units of the charging controller 188 and the battery controller 196, to convert and/or process various input, command, and/or signals, may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

Examples of the memory 220 may include a hard disk drive (HDD), and a secure digital (SD) card. Further, the memory 220 may include non-volatile/volatile memory units such as a random-access memory (RAM)/a read only memory (ROM), which may include associated input and output buses. The memory 220 may be configured to store various other instruction sets for various other functions of the machine 100, along with the set of instruction, discussed above.

INDUSTRIAL APPLICABILITY

During a work cycle, the machine 100 may operate and use up its battery power and may eventually run out of charge. Given that the battery unit 160 may need to be appropriately charged and replenished before the start of the next work cycle or for performing one or more functions in the same work cycle, an operator of the machine 100 may bring forth the charger 172 and may insert and connect the first power supply connector 184' with the first charging receptacle 180'. In that manner, a connection (e.g., an operable connection) between the charger 172 and the battery unit 160 may be attained and a corresponding command may be delivered to the charging controller 188 to charge the battery unit 160.

Figure 3:
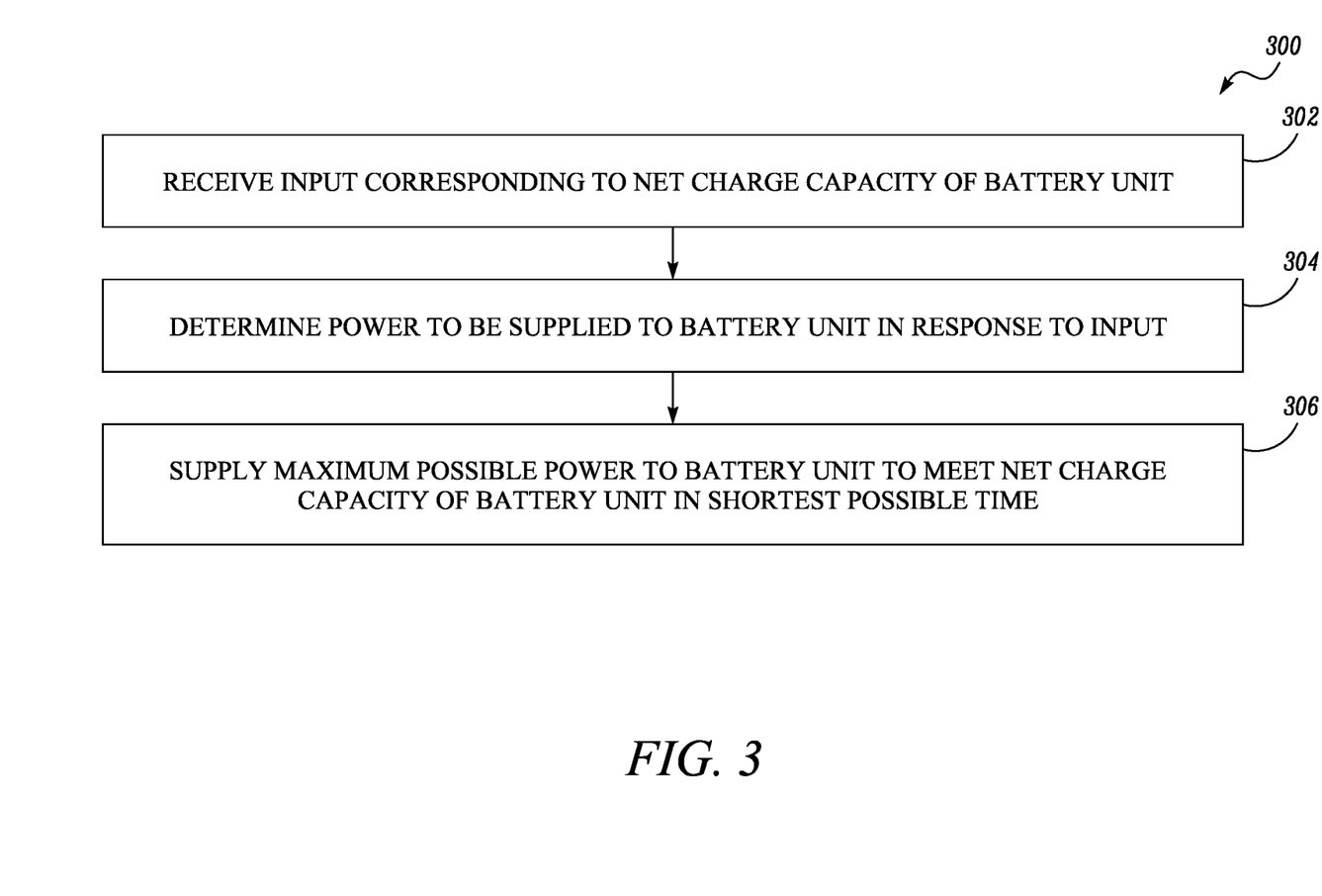
FIG. 3 is a flowchart illustrating a method for charging the battery unit of the machine, in accordance with an aspect of the present disclosure.

Referring to FIG. 3, an exemplary method for charging the battery unit 160 is set out. The method is discussed by way of a flowchart 300 and illustrates an exemplary process executable by the charging controller 188. The flowchart 300 is also discussed in conjunction with discussions that correspond to FIGS. 1 and 2. The method starts at step 302.

At step 302, the charging controller 188 is configured to receive an input corresponding to a net charge capacity of the battery unit 160; at step 304, the charging controller 188 is configured to determine a power to be supplied to the battery unit 160 by the charger 172 to charge the battery unit 160 in response to the input; and, at step 306, the charging controller 188 is configured to supply the maximum possible power to the battery unit 160 from the charger 172 through the first connection 208' to meet the net charge capacity of the battery unit 160 in shortest possible time. The method ends at step 306.

For the purpose of further understanding one or more aspects of the present disclosure, the forthcoming description includes discussions related to certain exemplary scenarios in which the charging controller 188 may determine the power (i.e., the maximum possible power) to be supplied to the battery unit 160 from the charger 172 based on one or more of the factors that have been discussed above.

In an exemplary first scenario, discussed with regard to the first factor discussed above, if the capacity for power transfer of each of the first connection 208' and the second connection 208" equals to 350 kilowatts (kW), the charging controller 188 may determine that a total power suppliable through the first connection 208' and the second connection 208" is a maximum of 700 kW so as to not to exceed the combined capacities of the first connection 208' and the second connection 208" (i.e., 350 kW+350 kW). In such a case, even if the power transferrable to the battery unit 160 according to net charge capacity of the battery unit 160 (as received from the battery controller) is exemplarily 1000 kW, the battery unit 160 may receive a maximum possible power of 700 kW, given the total capacity of the first connection 208' and the second connection 208" is limited to transfer of 700 kW of power.

As an exemplary second scenario, discussed with regard to the second factor discussed above, if a power that the charger 172 may receive from the grid source 200 is equal to 600 kW, the charger 172 may convert the received electrical power and may be able to supply 400 kW to the battery unit 160 (i.e., in a proportion of 3:2). Therefore, considering a merger of the first scenario with the second scenario, even if the power transferrable to the battery unit 160 according to net charge capacity of the battery unit 160 (as received from the battery controller 196) is exemplarily 1000 kW; or even if the total capacity of the first connection 208' and the second connection 208" can transfer up to 700 kW of power, the battery unit 160 may receive a maximum possible power of 400 kW.

As an exemplary third scenario, discussed with regard to the third factor discussed above, if the operational temperature exceeds the operational temperature threshold by 20° C., the charging controller 188 may reduce a corresponding amount of 50 kW from the power to be supplied to the battery unit 160 (i.e., in a proportion of 2:5) from the charger 172. Therefore, considering the merger of the first, second, and the third scenarios, even if the power transferrable to the battery unit 160 according to net charge capacity of the battery unit (as received from the battery controller 196) is exemplarily 1000 kW; or even if the total capacity of the first connection 208' and the second connection 208" allows power transfer of up to 700 kW; or even if 400 kW power can be supplied to the battery unit 160 based on the 600 kW power supply received from the grid source 200, the battery unit 160 may receive a maximum possible power of 350 kW (i.e., 400−50 kW).

As an exemplary fourth scenario, discussed with regard to the fourth factor discussed above, if a working temperature of the first charging receptacle 180' exceeds a working temperature threshold by 20° C., the charging controller 188 may reduce a corresponding quantity of 50 kW supplied through the first charging receptacle 180' and/or first connection 208' to the battery unit 160 (i.e., in a proportion of 2:5). Considering that the capacity and portion of the power suppliable through the first connection 208' may be equal to the capacity and portion of the power suppliable through the second connection 208" (i.e., 175 kW each), the fourth scenario, when merged with the first, second, and third scenarios provides for the following—even if the power transferrable to the battery unit 160 is exemplarily 1000 kW; or even if the total capacity of the first connection 208' and the second connection 208" can transfer up to 700 kW of power; or even if 400 kW power can be supplied to the battery unit 160 based on the 600 kW power supply received from the grid source 200, or even if the battery unit 160 may receive a maximum possible power of 350 kW (i.e., 400−50 kW) based on the exceeding operational temperature of the charger 172, the battery unit 160 may receive a maximum possible power of 300 kW [i.e., 125 kW (through the first connection 208')+175 kW (through the second connection 208")], since a portion of the power suppliable through the first connection 208' may be reduced by 50 kW resulting in a net suppliable power through the first connection 208', according to this example, to equal to 125 kW (resulting from the reduction of 50 kW from 175 kW, because of the working temperature of the first charging receptacle 180' exceeding the working temperature threshold by 20° C.).

As an exemplary fifth scenario, as viewed alone or in conjunction with the four scenarios discussed above, if the charging controller 188 determines that the power to be supplied to the battery unit 160 corresponds to a maximum possible power of 300 kW, and the charging controller 188 receives updated (e.g., incrementally reduced) net charge capacities of the battery unit 160 in successive intervals— e.g., 1 minute intervals, then for each such successive interval, the charging controller 188 may proportionally reduce the power to be supplied through one or more of the first connection 208' and the second connection 208" by exemplarily 10 kW. Such a reduction may continue till the battery unit 160 is fully charged, or, in other words, the net charge capacity of the battery unit 160 is fully met.

Although the various scenarios discussed above relate to a reduction in the power supply to the battery unit 160, it may be noted that any reduction in the power, as discussed above, may serve to manage and optimize the power supply to the battery unit 160, and may also serve to reduce any undue load, on the components of the system 168 (e.g., the charger 172, the charging receptacles 180, power supply connectors 184, the connections 208, etc.) and may also serve to prevent system faults and prolong component life.

However, in the same system 168, as additional connections or additional chargers (e.g., of the similar type) are possible, it may be in turn possible for the charging controller 188 to utilize those connections and chargers as well, and supply increased power to the battery unit 160 by way of such connections and chargers such that the maximum possible power (e.g., according to 1000 kW) or an optimized amount of power may be supplied to the battery unit 160 to meet the net charge capacity of the battery unit 160 in the shortest possible time or within a predefined period. In the case of additional chargers, the charging controller 188 may adapt to the different power limits of the chargers so as to supply the battery unit 160 with a maximum possible power in the shortest possible time or within a predefined period. Such a system (e.g., system 168) may also allow for flexibility and modularity in supplying power (e.g., including fast charge and/or slow charge, as required in different scenarios) to a wide variety of battery units (i.e., battery units of various types, capacities, and configurations, and belonging to wide variety of machines or other devices) so that those battery units may be effectively charged at a worksite where spatial constraints, logistics, and the like, may be a challenge or sparsely available, negating the need to have multiple chargers or complex and bulky charging system to charge such battery units.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A system for charging a battery unit configured to power a work machine, the system comprising:
   at least one charger to charge the battery unit;
   one or more charging receptacles and one or more power supply connectors, the one or more power supply connectors configured to be correspondingly received into the one or more charging receptacles to correspondingly attain one or more connections between the at least one charger and the battery unit; and
   a charging controller communicably coupled to the at least one charger, the charging controller configured to:
   receive an input corresponding to a net charge capacity of the battery unit;
   determine a power to be supplied to the battery unit by the at least one charger to charge the battery unit in response to the input; and
   supply the power to the battery unit from the at least one charger through the one or more connections,
   wherein the power to be supplied to the battery unit corresponds to a maximum possible power that is supplied to meet the net charge capacity of the battery unit in a shortest possible time, and wherein the charging controller is configured to adjust the power to be supplied based on at least one of:
   a temperature of the at least one charger, or
   a temperature of the one or more charging receptacles.

2. The system of claim 1, wherein to determine the power to be supplied to the battery unit, the charging controller is configured to:
   detect corresponding capacities of the one or more connections for supplying corresponding portions of the power therethrough; and
   summate the capacities together to arrive at a total capacity of the one or more connections for supplying the power therethrough.

3. The system of claim 1, wherein to determine the power to be supplied to the battery unit, the charging controller is configured to:
   detect an incoming power received by the at least one charger from an external power source; and
   adjust the power to be supplied to the battery unit based on the detected incoming power.

4. The system of claim 1, wherein the charging controller is configured to:
   determine if the temperature of the at least one charger exceeds a temperature threshold; and
   reduce an amount from the power to be supplied to the battery unit based on a value by which the determined temperature exceeds the temperature threshold.

5. The system of claim 1, wherein the charging controller is configured to:
   estimate a portion of the power to be supplied to the battery unit through at least one charging receptacle of the one or more charging receptacles;
   determine if the temperature of the one or more charging receptacles exceeds a temperature threshold; and
   reduce a quantity from the portion based on a measure by which the temperature of the one or more charging receptacles exceeds the temperature threshold.

6. The system of claim 1, wherein the charging controller is configured to:
   receive data corresponding to the net charge capacity of the battery unit in successive intervals, wherein with every successive interval the net charge capacity of the battery unit decreases as the charge in the battery unit increases; and
   reduce the power to be supplied to the battery unit for every successive interval based on a decrease in the net charge capacity of the battery unit for every successive interval.

7. A method for charging a battery unit configured to power a work machine, the method comprising:
   receiving, by a charging controller, an input corresponding to a net charge capacity of the battery unit;

determining, by the charging controller, a power to be supplied to the battery unit by at least one charger to charge the battery unit in response to the input;

supplying, by the charging controller, the power to the battery unit from the at least one charger through one or more connections attained between the at least one charger and the battery unit, the one or more connections being attained by having one or more power supply connectors correspondingly received into one or more charging receptacles; and adjusting the supplied power in response to one or more parameters associated with a functioning of the charger, wherein the power to be supplied to the battery unit corresponds to a maximum possible power that is supplied to meet the net charge capacity of the battery unit in a shortest possible time.

8. The method of claim 7, wherein determining the power to be supplied to the battery unit includes:

detecting, by the charging controller, corresponding capacities of the one or more connections for supplying corresponding portions of the power therethrough;

summating, by the charging controller, the capacities together to arrive at a total capacity of the one or more connections for supplying the power therethrough;

detecting, by the charging controller, an incoming power to the at least one charger from an external power source;

determining a power corresponding to the detected incoming power; and determining that the power to be supplied is a smallest among: (i) the total capacity of the one or more connections, (ii) the determined power corresponding to the detected incoming power, and (iii) a power transferable to the battery unit according to the net charge capacity of the battery unit.

9. The method of claim 8, further comprising:

detecting, by the charging controller a temperature difference between an operational temperature associated with the at least one charger and an operational temperature threshold, or a temperature difference between a working temperature of the at least one charging receptacle and a working temperature threshold;

determining an amount of power based on the detected temperature difference; and determining that the power to be supplied is a smallest among: (i) the total capacity of the one or more connections, (ii) the determined power corresponding to the detected incoming power, (iii) the power transferable to the battery unit according to the net charge capacity of the battery unit, and (iv) the determined amount of power based on the detected temperature difference.

10. The method of claim 7, further comprising:

receiving, by the charging controller, data corresponding to the net charge capacity of the battery unit in successive intervals, wherein with every successive interval the net charge capacity of the battery unit decreases as the charge in the battery unit increases; and reducing, by the charging controller, the power to be supplied to the battery unit for every successive interval based on a decrease in the net charge capacity of the battery unit for every successive interval.

11. The method of claim 7, further comprising:

receiving, by the charging controller, a command to charge the battery unit pursuant to attaining the one or more connections between the at least one charger and the battery unit.

12. The method of claim 7, wherein adjusting the supplied power in response to one or more parameters associated with a functioning of the charger includes reducing the supplied power based on an amount a temperature of the charger exceeds a threshold and/or a power supplied to the charger by an external power source.

13. A machine system, comprising:

a work machine including an implement at a first side of the work machine and a battery unit at a second side of the machine, wherein the implement is configured to be actuated via a machine system powered with the battery unit;

at least one charger to charge the battery unit;

one or more charging receptacles and one or more power supply connectors, the one or more power supply connectors configured to be correspondingly received into the one or more charging receptacles to correspondingly attain one or more connections between the at least one charger and the battery unit;

a charging controller communicably coupled to the at least one charger, the charging controller configured to:

receive an input corresponding to a net charge capacity of the battery unit;

determine a power to be supplied to the battery unit by the at least one charger to charge the battery unit in response to the input; and supply the power to the battery unit from the at least one charger through the one or more connections, wherein the power to be supplied to the battery unit corresponds to a maximum possible power that is supplied to meet the net charge capacity of the battery unit in a shortest possible time.

14. The machine system of claim 13, wherein to determine the power to be supplied to the battery unit, the charging controller is configured to:

detect corresponding capacities of the one or more connections for supplying corresponding portions of the power therethrough; and summate the capacities together to arrive at a total capacity of the one or more connections for supplying the power therethrough.

15. The machine system of claim 13, wherein to determine the power to be supplied to the battery unit, the charging controller is configured to:

detect an incoming power received by the at least one charger by an external power source; and adjust the power to be supplied to the battery unit based on the incoming power.

16. The machine system of claim 13, wherein the charging controller is configured to:

detect if an operational temperature associated with the at least one charger exceeds an operational temperature threshold; and reduce an amount from the power to be supplied to the battery unit based on a value by which the operational temperature exceeds the operational temperature threshold.

17. The machine system of claim 13, wherein the charging controller is configured to:

estimate a portion of the power to be supplied to the battery unit through at least one charging receptacle of the one or more charging receptacles;

detect if a working temperature of the at least one charging receptacle exceeds a working temperature threshold; and reduce a quantity from the portion based on a measure by which the working temperature exceeds the working temperature threshold.

18. The machine system of claim 13, wherein the charging controller is configured to:

receive data corresponding to the net charge capacity of the battery unit in successive intervals, wherein with every successive interval the net charge capacity of the battery unit decreases as the charge in the battery unit increases; and reduce the power to be supplied to the battery unit for every successive interval based on a decrease in the net charge capacity of the battery unit for every successive interval.

19. The machine system of claim 13, further comprising a battery controller communicably coupled to the battery unit, the battery controller configured to determine data corresponding to the net charge capacity of the battery unit, wherein data corresponding to the net charge capacity of the battery unit is received by the charging controller from the battery controller.

20. The machine system of claim 13, wherein the implement is configured to haul a load.

* * * * *